United States Patent
Civitella et al.

(10) Patent No.: US 11,081,010 B2
(45) Date of Patent: Aug. 3, 2021

(54) AUTOMATICALLY PAIRING GPS DATA TO PLANNED TRAVEL ROUTES OF MOBILE OBJECTS

(71) Applicant: TRANSFINDER CORPORATION, Schenectady, NY (US)

(72) Inventors: Antonio Civitella, Schenectady, NY (US); Joseph Messia, Schenectady, NY (US)

(73) Assignee: TRANSFINDER CORPORATION, Schenectady, NY (US)

( * ) Notice: Subject to any disclaimer, the term of this patent is extended or adjusted under 35 U.S.C. 154(b) by 269 days.

(21) Appl. No.: 16/212,806

(22) Filed: Dec. 7, 2018

(65) Prior Publication Data

US 2020/0126427 A1 Apr. 23, 2020

Related U.S. Application Data

(60) Provisional application No. 62/747,195, filed on Oct. 18, 2018.

(51) Int. Cl.
| | |
|---|---|
| *G08G 1/00* | (2006.01) |
| *G08G 1/01* | (2006.01) |
| *G01C 21/26* | (2006.01) |
| *G01S 19/51* | (2010.01) |

(52) U.S. Cl.
CPC .............. *G08G 1/20* (2013.01); *G01C 21/26* (2013.01); *G01S 19/51* (2013.01); *G08G 1/0125* (2013.01)

(58) Field of Classification Search
CPC ........ G08G 1/20; G08G 1/0125; G08G 1/205; G08G 1/005; G08G 1/127; G01S 19/51; G01S 19/14; G01C 21/26; G01C 21/28
See application file for complete search history.

(56) References Cited

U.S. PATENT DOCUMENTS

| | | | |
|---|---|---|---|
| 8,694,241 B1* | 4/2014 | Kadous | G08G 1/0141 |
| | | | 701/412 |
| 9,070,296 B1* | 6/2015 | Kadous | G01S 19/14 |
| 9,311,819 B1* | 4/2016 | Kadous | G08G 1/0141 |
| 9,640,074 B2 | 5/2017 | Kustanowitz | |
| 10,429,192 B2* | 10/2019 | Kitchel | G01C 21/20 |
| 2006/0247848 A1 | 11/2006 | Cheng | |
| 2017/0219360 A1* | 8/2017 | Cui | G01S 19/396 |
| 2018/0188037 A1* | 7/2018 | Wheeler | H04L 67/12 |
| 2018/0259347 A1 | 9/2018 | Khasis | |

OTHER PUBLICATIONS

International Search Report and Written Opinion of the International Searching Authority for International Application No. PCT/US2019/046167 dated Nov. 4, 2019.

* cited by examiner

*Primary Examiner* — Nga X Nguyen
(74) *Attorney, Agent, or Firm* — Heslin Rothenberg Farley & Mesiti P.C.

(57) ABSTRACT

GPS data is paired with planned travel routes for mobile objects including vehicles. A system obtains GPS data from a mobile object and compares the GPS data to planned travel routes. The comparison includes comparing GPS coordinates of the mobile object to the planned travel routes to determine if a specified level of GPS coordinates are within a specified distance or buffer distance from a planned travel route within a specified period of time, the mobile object is travelling in the same direction of a planned travel route, and the planned travel route is unique. If such conditions are met, the mobile object is assigned or matched to a planned travel route.

20 Claims, 5 Drawing Sheets

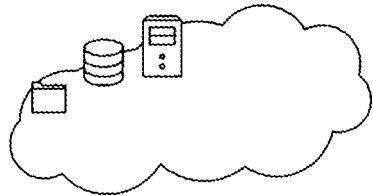 Server or servers where data is transmitted and processes and algorithms are run.

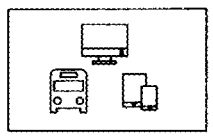 The creation of a planned route from any method. This could be a user interacting with a device such as a computer or mobile device or the usage of GPS data that is stored as a plan.

 A vehicle or device sending GPS data of location.

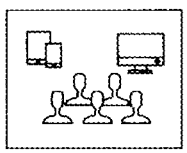 End users seeing the results of the assignments of planned route to GPS data.

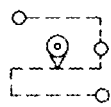 Planned route data. Could be stored in any format.

 GPS data.

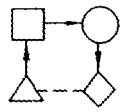 Processes and algorithms.

 Completed process showing planned route coupled with actual GPS location.

FIG. 2

AUTOMATICALLY PAIRING GPS DATA TO PLANNED TRAVEL ROUTES OF MOBILE OBJECTS

CROSS-REFERENCES TO RELATED APPLICATIONS

This application claims priority to U.S. Patent Application Ser. No. 62/747,195 filed on Oct. 18, 2018 entitled "Automatically Pairing GPS Data to Planned Travel Routes of Mobile Objects", the entire disclosure of which is incorporated by reference.

FIELD OF THE INVENTION

This invention relates, in general, to mobile objects such as vehicles or mobile devices, and in particular, to automatically pairing GPS data to planned travel routes of mobile objects.

BACKGROUND

Mobile objects include objects which are capable of movement such as vehicles (e.g., cars, trucks, buses and trolleys) or mobile devices, including cellular devices and wireless communication devices. Mobile objects such as buses or trucks may be used to provide services, such as delivering persons, products or other cargo. Also, fleets of vehicles are often used to travel particular travel routes. These fleets may frequently travel planned travel routes in accordance with a desired schedule. Tracking of fleets of vehicles either in real time, or historically, can be a difficult task.

One challenge in operating fleets of vehicles is the automatic tracking of each vehicle to determine if the vehicle is on or off a travel route or path. Also, it is a challenge to automatically keep track of real time mobile objects, and to maintain historical travel information and routes undertaken by multiple individual vehicles, such as buses within a fleet.

SUMMARY

Shortcomings of the prior art are overcome and additional advantages are provided through the provision of a method, system and/or computer program product for pairing GPS data to planned travel routes. The method includes obtaining travel route information representative of a travel route; obtaining GPS data comprising GPS coordinates relating to a mobile device or vehicle; comparing the GPS data to the travel route information to determine if GPS coordinates fall within a threshold buffer distance from the travel route; determining if a level of GPS coordinates which fall within the buffer distance threshold during a preselected period of time; and designating the position of the mobile device or vehicle as assigned to the travel route if the level is above a particular amount. The method is implemented to perform automatically via a computer system.

The level of GPS coordinates which fall within the buffer distance threshold may be a number or a percentage. The travel route information may include direction of travel, time and date. The method includes comparing GPS data to the one or more of direction of travel specified in the travel route information, time specified in the travel route information, and date specified in the travel route information. The method includes determining if the direction of travel from the GPS data is the same as a direction of travel specified within the travel route information. The GPS data may be real time data, and/or historical data. The GPS data may include GPS coordinates, time speed and direction of travel. The method may include displaying the position of the object relative to the travel route when the position is assigned. The method may also include designating the position as unassigned to the travel route when the level is below the particular amount, when the direction of travel of the mobile object is different than the direction of the planned travel route or when the mobile object is a certain distance outside the buffer distance. The method may include displaying that the position of the mobile object relative to the travel route is unassigned. And, the method may redisplay the position of the object after the mobile device or vehicle becomes reassigned to the travel route. The mobile object is reassigned when the same conditions, as described above, for assigning the mobile device are achieved. Each aforementioned step of the method is implemented to perform and occurs automatically via a computer system.

The computer program product includes a computer readable storage medium readable by a processing circuit and storing instructions for performing the method, for example, as described above and herein. Also, computer-implemented systems relating to one or more aspects of the method are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 2 depicts the components of the system shown in FIG. 1;

DETAILED DESCRIPTION

In one or more aspects, a capability is provided for automatically pairing GPS data to planned travel routes of mobile objects. The pairing is performed automatically via a computer system to designate a mobile object such as a mobile device or vehicle as assigned to a travel route. Mobile objects may include mobile devices, such as wireless communication devices (e.g., smart phones) and/or vehicles such as trucks, buses, airplanes, and trolleys. A mobile object may be assigned (or matched) to a travel route after certain conditions are met. The mobile object may be unassigned (or unmatched) to a travel route when the conditions are no longer met. A mobile device which has been unassigned from a travel route may be re-assigned to a travel route, if the same conditions are later met.

Travel routes are planned routes designated to be travelled by a mobile object. Such planned travel routes include automobile routes, bus routes, truck routes, airplane routes and/or trolley routes. Common examples of a planned travel route include city bus public transportation routes and school bus routes.

Further details regarding pairing GPS data to planned travel routes of mobile objects are described with reference to FIG. 1. Aspects of this system or processes may be performed by a computer system including one or more processors in the mobile object, by one or more processors remote to the mobile object, or by a combination of processors in the mobile object and remote to the mobile object. Many possibilities exist.

Figure 1:
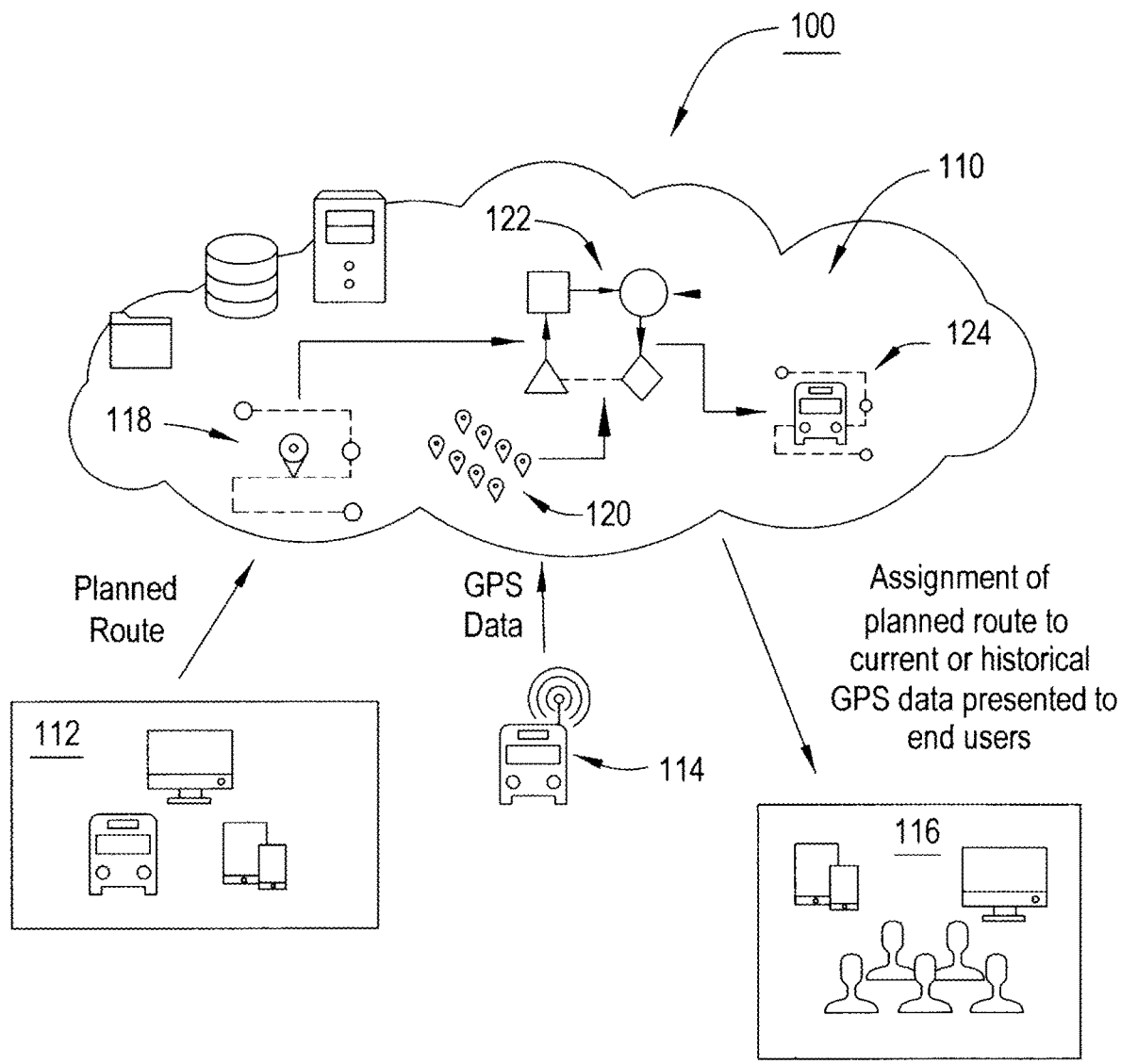
FIG. 1 depicts one example of schematic representation of a system in accordance with an aspect of the present invention.

Referring to FIGS. 1 and 2, aspects of a system in accordance with an exemplary embodiment for pairing GPS data to planned travel routes of mobile objects is shown. GPS data includes GPS coordinates, time, direction of travel, and speed. A system 100 includes one or more processors or servers where data is transmitted and processes including specific algorithms are performed. In one example, the system may be implemented via cloud computing 110. The system receives or obtains planned travel route information 112. The travel route information may be obtained by any viable method including receiving such information from a computer or mobile device or generating the same from GPS data that has been stored to represent a planned travel route. Other techniques for obtaining travel route information may also be used to create, generate, and/or obtain the same.

A mobile object 114, such as a wireless communication device including vehicles equipped with the same, is enabled to send GPS data to the system 100 including one or more processors or servers. Users 116 are enabled to view the results of the pairing of GPS data to the planned travel routes of the mobile objects. The users 116 are allowed to view when a mobile object 114 is assigned or matched to a planned travel route based upon its GPS data. Within the system 100 and memory associated therewith, the planned travel route information 118 may be stored in any desirable format. A process or algorithm performed by the processor 122 uses the planned travel route information 118 and GPS data 120. Processes and algorithms involve calculations to compare the planned travel route information 118 with the GPS data 120. The calculations generate a result 124 when the mobile object is travelling along a unique planned travel path. The system 100 will designate the mobile object as being assigned or matched to the planned travel path. The system 100 will show to users 116 the planned travel route along with the actual GPS location of the mobile object. The system may show the routes continuously or only when the mobile object is assigned to the planned travel route. The system can show the user when a route has been assigned or matched by displaying the route and/or the mobile object or changing the display of the route and/or mobile object. Also, the system may store the assignment for later use with data analytics.

Figure 3:
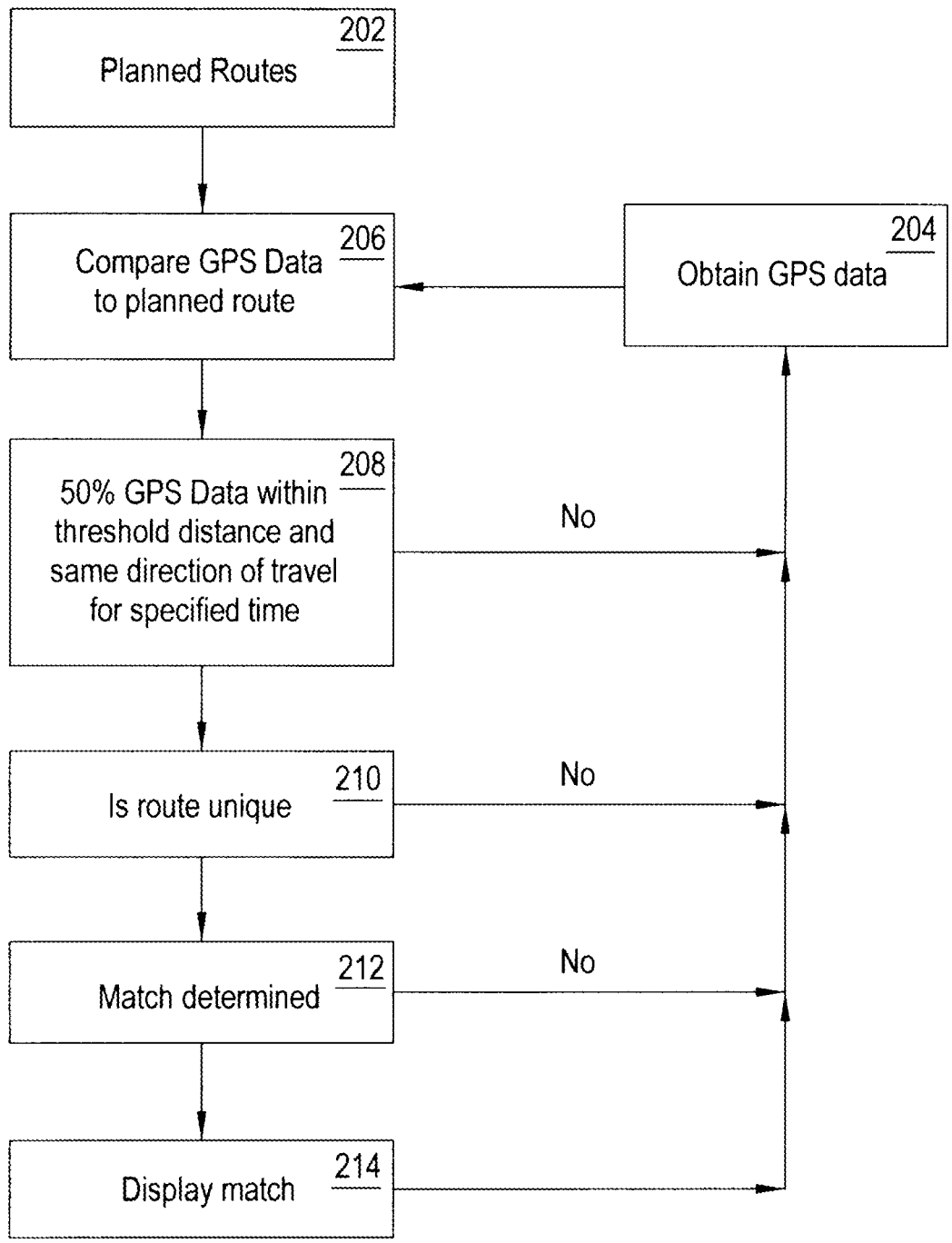
FIG. 3 depicts one example of the processes performed in accordance with an aspect of the present invention.

Referring now to FIG. 3, an example of the process for pairing GPS data to planned travel routes of mobile objects will be described in more detail. Within the system, the planned travel route is obtained by one or more processors in step 202. In addition, the processor obtains GPS information including GPS coordinate data as shown in additional step 204. The processor then compares the GPS data to the planned travel route, as shown in step 206. In this comparison, the GPS data coordinates, representing locations of the mobile object during its travel, are compared to the planned travel route. For example, the location of the mobile object based upon its GPS coordinates is compared with the location of the planned travel route. These locations are compared to determine if the location of the GPS coordinates is within a specified buffer distance from the planned travel route. Data is analyzed by the processor to determine if a preselected level, e.g., number or percentage, of GPS coordinate points fall within the buffer distance over a preselected period of time. The system may be configured to use different time periods and different buffer distance thresholds depending upon the system operator's preferences. The processor determines if a predetermined level of the GPS data, measured within a specified time period, is within the distance threshold, and the mobile object is travelling in the same direction as the planned travel route in step 208. Such calculations are continuously and/or periodically performed over time.

In other words, the system operates so that the processor determines whether a specific number or percentage of GPS data coordinates travelled by the mobile object are within the preselected threshold distance over a specified time period, and if the direction of travel of the mobile object is within the same direction as a planned travel route.

If the aforementioned conditions are met, the system in step 210 determines if the travel route being travelled by the mobile device is a unique travel route. A unique travel route is designated when the location of the mobile object is on a planned travel route position which is not shared or located on a different planned travel route. If the system determines that the travel route is unique, the system designates the mobile object as being "assigned" or "matched" to the planned travel route, in step 212. Then, in an additional step 214, the location of the mobile object may be displayed on a user interface such as a graphical user interface to one or more users of the system. However, other means for displaying the travel of the mobile device along the planned travel path may also be performed.

If the system does not determine that the specified number or percentage of GPS data coordinates are within the buffer distance, or if GPS coordinates within the buffer distance were not determined within the specified period of time, or if the mobile object is not within the same direction of travel, the system operates to continuously obtain the GPS data information (including coordinates to continuously perform the comparison of the GPS data to the planned travel routes) as specified in steps 206 and 208. Similarly, if the system does not designate the route as a unique route or does not designate the mobile object as being assigned, then the system continues to obtain GPS data to perform the steps shown in 206, 208, 210, and 212.

In addition, the system continuously obtains GPS data after the mobile object is assigned or matched to calculate if the mobile object is still located on the planned travel path. Accordingly, the system continues to determine if the specified level of GPS data points are within the specified buffer distance and in the same direction of travel for the specified period of time. The system continues to determine if the travel route is unique and if an assignment or match is designated. If at any time during the performance of the process, a mobile object which has been matched to its travel path becomes unassigned or unmatched, the system may be configured to continue to display the travel path of the unassigned mobile object for the users. Alternatively, the system may be configured to not display the location of the mobile object relative to its travel path after it has become unassigned or unmatched. The system operates automatically so that the steps of the process are performed by one or more processors. The selection of the buffer distance, specified period of time and level, e.g., a percentage or number, of GPS data points falling within the buffer distance, may be selected by an operator of the system.

In step 202, where planned routes are obtained by the processor, there may be multiple planned travel routes stored in the system's memory. Accordingly, it is possible that a mobile object may be matched to a particular travel route during its course of travel, and then become unmatched, and then subsequently become matched to a different travel route. The system operates to determine if the GPS data for a mobile object is within a specified threshold distance from one or more travel routes stored in the system's memory.

Figure 4:
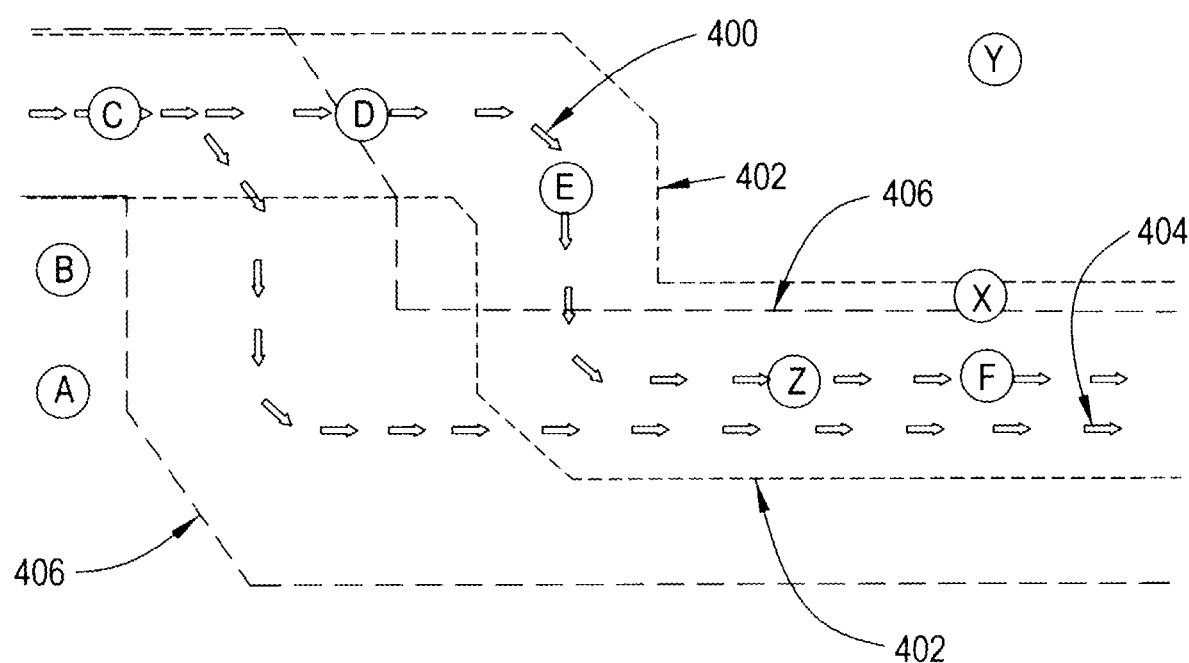
FIG. 4 depicts one example of a schematic representation of travel route information and travel paths, travelled or used by mobile objects in accordance with an aspect of the present invention.

Referring to FIG. 4, operation of the system in connection with a mobile object will be described. In this example, there are at least two planned travel routes stored in the system's memory. The first stored planned travel route is designated as the blue path 400 and a second planned travel route designated as the red path 404. Both of the blue path and the red path travel routes have a buffer distance associated therewith. The blue buffer distance and a red buffer distance can also be referred to as a blue assign buffer 402 and a red assign buffer 406, as shown in FIG. 4. Each buffer distance is specified by the system to be a particular distance from a particular point on each travel route of the blue path and red path, respectively. For example, the blue buffer distance 402 may be specified as 30 feet from or parallel to the blue planned travel route or the blue path. Similarly, the red assign buffer distance 406 may be specified by the system as 30 feet from or parallel to the red planned travel route or the red path. Each of these buffer distances are shown in FIG. 4.

As also shown in FIG. 4, locations travelled by the mobile object are designated with the letters A, B, C, D, E, X, Y, and Z, representing locations of travel of the mobile object from points A through Y. The GPS coordinates are generated from the mobile object continuously and/or periodically throughout its travel path and received or obtained by the system. Accordingly, mobile object transmits GPS coordinates including those at positions A through Y during its duration of travel. In this regard, coordinates representing travel to position A are transmitted to the system processor and the processor determines if the coordinates travelled within a specified time period (e.g. 60 seconds) up to location A are within a buffer distance from either a unique blue or unique red planned travel route, and if the mobile object is in the same direction of travel a one of the planned travel routes. The system repeats the process including up to when the mobile object transmits its GPS data representative of it being at location B. Since neither location A nor location B are within a buffer distance of either the blue path or red path, the system does not match or assign a mobile object to either the red or blue planned travel routes or red or blue path.

As the mobile object proceeds to location C, its GPS data is received by the system and processor, which determines whether location C is within the blue travel route buffer or and/or the red travel route buffer. In this example, since location C is within both the red travel path buffer and blue travel path buffer, the system does not count this location as being towards an assignment or match because the location does not fall within a unique travel route. When the mobile object is at location C, the system recognizes that the mobile object is on the blue and red routes. However, since location C is a travel route which is not yet unique, the system would not designate the mobile object (when at location C) as being "matched" or "assigned" to the blue or red travel route.

In this example, the system is configured to determine if a specified percentage of GPS coordinates are within the buffer distance during a specified period of time. In this example, the period of time is 60 seconds. Also, in this example, the system is programmed to determine that at least 50% of the GPS data coordinates are within a particular planned travel path buffer distance. In addition, in this example, the system is preprogrammed to determine and calculate the direction of travel of the mobile object. And, finally, the system is configured to determine if the location of the mobile object is at a location which is unique to a travel path. In this example, the mobile object travels from points C to D within 60 seconds (the specified time period).

Once mobile object moves to location D, the system determines that the object is at this location, and calculates whether 50% of the GPS points determined within the last 60 seconds are within a unique planned travel route, either the blue travel route or red travel route. Since location D is outside the red travel route buffer distance but within the blue travel route buffer distance, the system recognizes the same. Because the system recognized that at least 50% of the GPS points determined in the last 60 seconds were between locations C and D, and were all within the unique blue travel route and buffer distance, and were in the same direction of travel as the blue travel route, the system designates the mobile object as being "matched" or "assigned" to the blue travel route.

In one example, once the mobile object is matched to a travel route such as the blue travel route, the system allows the users of the system to view the location of the mobile object on a representation of the travel route. This representation can be on, for example, a graphical user interface which includes a map or similar geographical representation. Other indications by users that the mobile object is matched or assigned to a path may also be implemented by the system. For example, the user may receive a notification of a match including an email or text message indicating the mobile object has been assigned a route.

As the mobile object travels to points E and F, the system continues to calculate whether the GPS data is within the specified buffer distance during the designated period of time, for example, 60 seconds. So long as the aforementioned criteria are met and the direction of travel of the mobile object is in the same direction of travel as the assigned travel route or path, the system continues to designate a mobile object as assigned to the blue planned travel route and allows the users to view the same on the user interface. Alternatively, so long as the aforementioned criteria are met, except for the travel route being unique, the system may continue to designate a mobile object as being matched to a travel route. In other words the system may operate so the criteria for a route being unique is required only for an initial assignment or match. In this manner, mobile objects which have travelled from a unique planned travel route to a location which is on a common planned travel route, will still be assigned to the matched planned travel route.

If the mobile object travels from location F to location X and location Y, the system continues to perform the aforementioned calculations. At location X, the system may continue to match the mobile object to the blue travel path because the GPS data coordinates are within the blue buffer distance during the specified period of time, and the direction of travel continues to be in the direction of the blue travel route or path. However, the system calculates that the GPS coordinates at location Y are not within the blue buffer distance (or any buffer distance) during a specified period of time and then unassigns or unmatches the mobile object to the blue travel route or path. Also, in another embodiment, the system may be configured to allow the mobile object to continue to be matched to the travel path until different conditions are met. For example, the system may be configured to unassign the mobile object when the mobile object is calculated to be a specified deviation distance from the planned travel path. The deviation distance may be different than, for example greater than, the buffer distance so that the mobile object may travel out of the buffer distance (after it has been assigned) but not become unassigned until it reaches a further preselected distance.

If the mobile object travels from point F to point Z, the calculations performed by the system are continued to be performed. Accordingly, even though point Z is within the blue buffer distance, since the system calculates within 60 seconds that GPS locations between point F and Z travelled by the mobile object were not in the same direction of travel for the blue travel route or path, the system unassigns or unmatch the mobile object from the blue travel route.

Also, for example, when the mobile object is located and travels from points C to F, the system is capable of calculating that the mobile object is within both the blue travel path buffer area and the red travel path buffer area. In addition, even though these locations on the travel path are no longer unique to a single travel path, the system continues to match the mobile object to the blue travel path because the mobile object has already been on a blue path in an area which is unique to the blue path or route.

Once the mobile object has been unmatched to a travel path, the calculations will continue the system will eventually determine if the mobile object is matched to either the blue travel path or the red travel path if the calculations performed by the processor reveal the location of the mobile object at a specified percentage of locations within a buffer area for a particular travel path over a particular period of time.

The distance of the buffer area and the level, e.g., number or percentage, of GPS data points within the buffer area may be programmed into the system by the users or other operators of the system. If the level of GPS coordinates is not programmed as a percentage but rather a number, then the system operates to determine if the selected number of GPS coordinates have been determined to be within a planned travel route buffer distance within the specified period of time, and in the same direction of travel, and on a unique travel route. In addition, for the system to match a mobile object to a travel path after it has been unmatched or unassigned from a travel path, the system must determine that the mobile object has achieved GPS locations that are within a specified level of GPS locations that are within a path buffer distance for a period of time, and within the same direction of travel of the travel route or path. These conditions are met, the mobile object may be rematched to any travel path which is maintained in the system's memory. During travel of the mobile object the system continuously and/or periodically calculates whether within a specified time period, for example 60 seconds, the GPS coordinates travelled by the mobile object are within a unique planned travel route buffer distance and in the same direction of travel.

In addition to the system being used to pair GPS data from a mobile object in real time, as previously described, the system may be used to pair historical GPS data for mobile objects.

When operating using real time data, the system may be used by users who are responsible for monitoring the locations of mobile objects, including a fleet of vehicles such as buses, or trolleys, or delivery trucks, to determine if the mobile objects are matched to a planned travel route. This information may be used to monitor the number of mobile objects that are on either the same travel routes and/or different travel routes. Also, the system may be used by users of buses or trolleys, such as in public transportation routes. For example, when a mobile object such as a bus or trolley is assigned to a planned travel route the user may view the route and the location of the bus or trolley on a device such as a mobile device. The mobile device may display the planned travel route for one or more vehicles as well as the vehicles which have been assigned (as described hereinabove) to the route.

In addition, when the system operates using historical GPS data, users of the system may use the system to determine if a particular mobile object was assigned or matched to a particular travel path at any point in historical time. The system may store GPS data as historical data during travel of a mobile object. In this regard, historical GPS data is accumulated over time and stored in the system or remotely. The historical GPS data can be used to perform data analytics or mobile objects and planned travel routes.

One example of a computer system that includes processors that may be used by one or more aspects of the present invention is described with reference to FIG. 5. In this example, the computer system is part of a computing environment including additional components that may or may not be used by aspects of the present invention.

Figure 5:
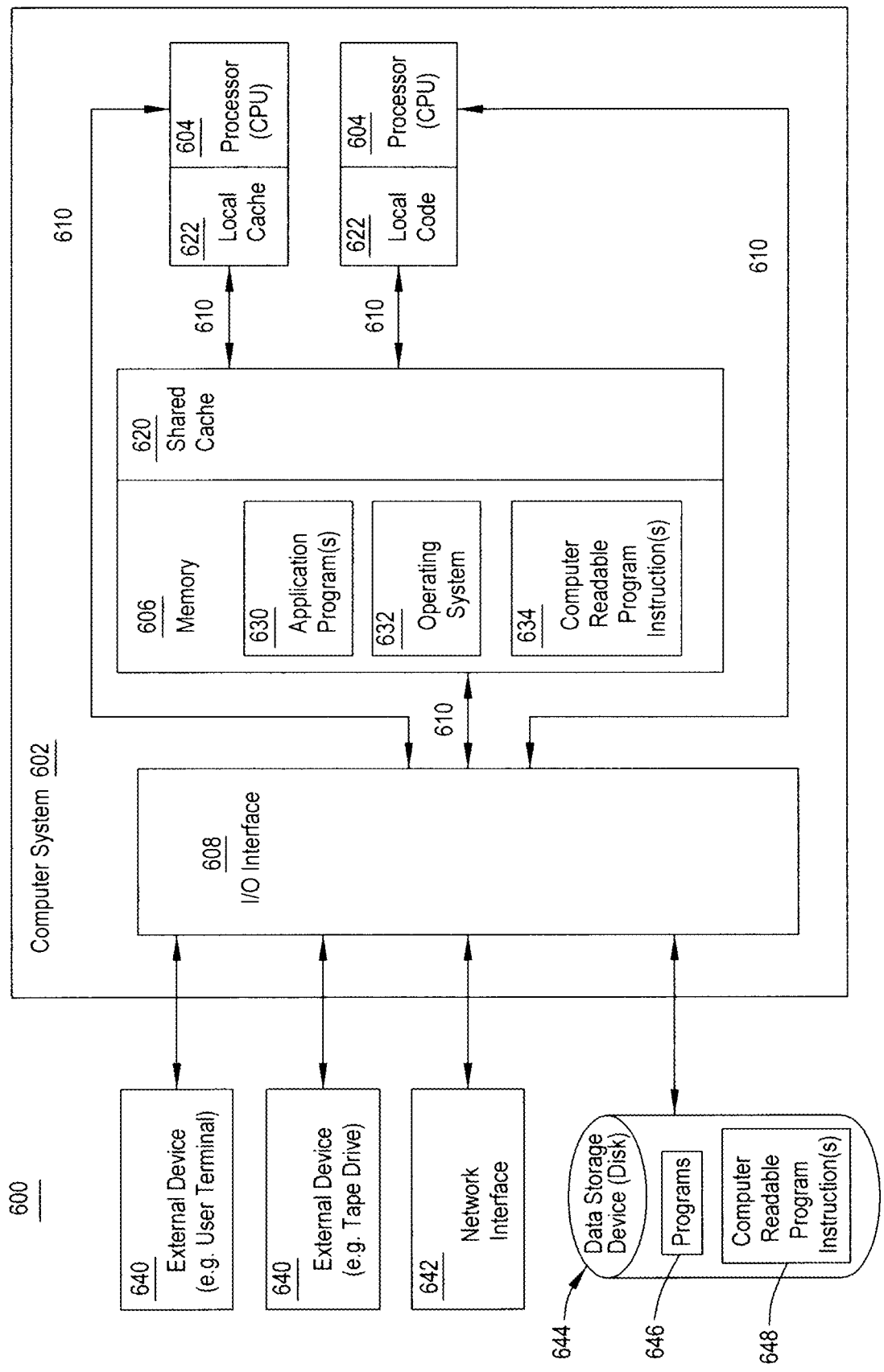
FIG. 5 depicts one example of a computing environment which may be used to incorporate and perform or more aspects of the present invention.

As shown in FIG. 5, a computing environment 600 useable to perform the process of this invention is disclosed. The computing environment includes, for instance, a computer system 602 shown, e.g., in the form of a general-purpose computing device. Computer system 602 may include, but is not limited to, one or more processors or processing units 604 (e.g., central processing units (CPUs)), a memory 606 (a.k.a., system memory, main memory, main storage, central storage or storage, as examples), and one or more input/output (I/O) interfaces 608, coupled to one another via one or more buses and/or other connections 610.

Bus 610 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 606 may include, for instance, a cache 620, such as a shared cache, which may be coupled to local caches 622 of processors 604. Further, memory 606 may include one or more programs or applications 630, an operating system 632, and one or more computer readable program instructions 634. Computer readable program instructions 634 may be configured to carry out functions of embodiments of aspects of the invention.

Computer system 602 may also communicate via, e.g., I/O interfaces 608 with one or more external devices 640, one or more network interfaces 642, and/or one or more data storage devices 644. Example external devices include a user terminal, a tape drive, a pointing device, a display, etc. Network interface 642 enables computer system 602 to communicate with one or more networks, such as a local area network (LAN), a general wide area network (WAN), and/or a public network (e.g., the Internet), providing communication with other computer devices or systems. For example, the system may be connected to a personal computer, tablet device or smartphone to communicate the assigned or unassigned status of mobile objects to user via a graphical user interface.

Data storage device 644 may store one or more programs 646, one or more computer readable program instructions 648, and/or data, etc. The computer readable program instructions may be configured to carry out functions of embodiments of aspects of the invention.

Computer system 602 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 602. Examples, include, but are not limited to: microcode, device drivers, redundant processing units, external disk drive arrays, RAID systems, tape drives, and data archival storage systems, etc.

Computer system 602 may be operational with numerous other general purpose or special purpose computing system environments or configurations. Examples of well-known computing systems, environments, and/or configurations that may be suitable for use with computer system 602 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

One or more of the processors and/or other aspects of the computer system or computing environment may be remote from the mobile object. Further, in one particular example, a processor, such as processor 604, may execute, in accordance with one or more aspects of the present invention, one or more machine learning engines and/or other engines to provide, based on training and learning, an optimal travel route or path for mobile object. These engines may be stored in memory, including main memory and/or one or more caches, and/or external storage, and may be executed on one or more processors. Man variations exist.

One or more aspects of the present invention are inextricably tied to computer technology and/or to the improvement of a technical field.

One or more aspects may relate to cloud computing. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages such as Angular, HTML, CSS, .NET Framework, C# and Microsoft SQL Server, and including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, different types of unmanned aerial vehicles may be used, as well as other types of neural networks and/or evolutionary algorithms. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

The invention claimed is:

1. A computer-implemented method of pairing GPS data to planned travel routes comprising:
   obtaining, by one or more processors communicatively coupled to a memory, travel route information from the memory representative of one or more travel routes, wherein the travel route information for each travel route of the one or more travel routes comprises a given number of predefined geographic locations on each travel route;
   continuously obtaining, by the one or more processors, GPS data comprising GPS coordinates, wherein the GPS coordinates represent positions of a mobile object, each position being at a given point in time, and wherein the mobile object is in motion during the continuously obtaining;
   comparing, by the one or more processors, the GPS data to the travel route information, wherein the comparing comprises:
   determining if one or more GPS coordinates fall within a buffer distance from a travel route of the one or more travel routes, wherein the buffer distance of each travel route of the one or more travel routes is configured individually; and
   based on determining that one or more GPS coordinates fall within the buffer distance for the travel route of the one or more travel routes, determining, by the one or more processors, a percentage of GPS coordinates within the buffer distance of at least one travel route of the one or more travel routes, based on individually comparing the GPS coordinates to the given number of predefined locations for each route of the one or more travel routes;

designating, via said by the one or more processors, the mobile object as assigned to a given travel route of the one or more travel routes if the percentage of GPS coordinates measured within a specified time period, which are within the buffer distance, is above a predefined threshold and no other mobile object is assigned to the travel route by the one or more processors and a current position of the mobile object is within a buffer of a predefined geographic location of no more than one travel route of the one or more travel routes; and based on the designating, displaying, in real-time, by the one or more processors, on a user interface of the mobile object information relating to the current position of the mobile object, wherein the information comprises the assigned given travel route.

2. The method of claim 1, wherein the travel route information further comprises one or more of a direction of travel, time and date.

3. The method of claim 2, wherein the comparing further comprises: comparing, by the one or more processors, the GPS data to the one or more of direction of travel specified in the travel route information, time specified in the travel route information, and date specified in the travel route information.

4. The method of claim 3, wherein the designating is also based on determining if direction of travel from the GPS data is the same as a direction of travel specified within the travel route information.

5. The method of claim 4, comprising displaying the current position of the object relative to the given travel route when given travel route is assigned.

6. The method of claim 5, further comprising designating the mobile object as unassigned to the travel route when the percentage is below said predefined threshold, when the direction of travel of the mobile object is different than the direction of the planned travel route or when the mobile object is a certain distance outside the buffer distance.

7. The method of claim 6, further comprising displaying that the current position of the object relative to the travel route is unassigned.

8. The method of claim 7, further comprising redisplaying the current position of the mobile object when the mobile object is reassigned to the given travel route.

9. The method of claim wherein the GPS data further comprises speed and direction of travel.

10. The method of claim wherein the GPS data is real time data.

11. The method of claim wherein the GPS data is historical data.

12. A computer system for pairing GPS data to planned travel routes, the computer system comprising:
a memory; and
one or more processors in communication with the memory, wherein the computer system is configured to perform a method, the method comprising:
obtaining, by the one or more processors, from the memory travel route information representative of one or more travel routes, wherein the travel route information for each travel route of the one or more travel routes comprises a given number of predefined geographic locations on each travel route;
continuously obtaining, by the one or more processors, GPS data comprising GPS coordinates wherein the GPS coordinates represent positions of a mobile object, each position being at a given point in time, and wherein the mobile object is in motion during the continuously obtaining;

comparing, by the one or more processors, the GPS data to the travel route information, wherein the comparing comprises:

determining if one or more GPS coordinates fall within a buffer distance from a travel route of the one or more travel routes, wherein the buffer distance of each travel route of the one or more travel routes is configured individually; and based on determining that one or more GPS coordinates fall within the buffer distance for the travel route of the one or more travel routes, determining, by the one or more processors, a percentage of GPS coordinates within the buffer distance of at least one travel route of the one or more travel routes, based on individually comparing the GPS coordinates to the given number of predefined locations for each route of the one or more travel routes;

designating, by the one or more processors, the mobile object as assigned to a given travel route of the one or more travel routes if the percentage of GPS coordinates measured within a specified time period, which are within the buffer distance, is above a predefined threshold and no other mobile object is assigned to the travel route by the one or more processors and a current position of the mobile object is within a buffer of a predefined geographic location of no more than one travel route of the one or more travel routes; and based on the designating, displaying, in real-time, by the one or more processors, on a user interface of the mobile object information relating to the current position of the mobile object, wherein the information comprises the assigned given travel route.

13. The computer system of claim 12, wherein the travel route information comprises one or more of a direction of travel, time and date.

14. The computer system of claim 13 wherein the comparing further comprises: comparing, by the one or more processors, the GPS data to the one or more of direction of travel specified in the travel route information, time specified in the travel route information, and date specified in the travel route information.

15. The computer system of claim 14, wherein the designating is also based on determining if direction of travel from the GPS data is the same as a direction of travel specified within the travel route information.

16. The computer system of claim 15 further comprising displaying the current position of the object relative to the given travel route when given travel route is assigned.

17. The computer system of claim 16, further comprising designating the mobile object as unassigned to the travel route when the percentage is below said predefined threshold.

18. The computer system of claim 17, further comprising displaying that the current position of the mobile object relative to the given travel route is unassigned.

19. The computer system of claim 18, further comprising redisplaying the position of the mobile object after the mobile object becomes reassigned to the travel route.

20. A computer program product for pairing GPS data to planned travel routes, the computer program product comprising:

at least one computer readable storage medium readable by a processing circuit comprising one or more processors and storage instructions for performing a method comprising:

obtaining, by the one or more processors, from the memory travel route information representative of one or more travel routes, wherein the travel route information for each travel route of the one or more travel routes comprises a given number of predefined geographic locations on each travel route;

continuously obtaining, by the one or more processors, GPS data comprising GPS coordinates wherein the GPS coordinates represent to positions of a mobile object, each position being at a given point in time, and wherein the mobile object is in motion during the continuously obtaining;

comparing, by the one or more processors, the GPS data to the travel route information, wherein the comparing comprises:

determining if one or more GPS coordinates fall within a buffer distance from a travel route of the one or more travel routes, wherein the buffer distance of each travel route of the one or more travel routes is configured individually; and based on determining that one or more GPS coordinates fall within the buffer distance for the travel route of the one or more travel routes, determining, by the one or more processors, a percentage of GPS coordinates within the buffer distance of at least one travel route of the one or more travel routes, based on individually comparing the GPS coordinates to the given number of predefined locations for each route of the one or more travel routes;

designating, by the one or more processors, the mobile object as assigned to a given travel route of the one or more travel routes if the percentage of GPS coordinates measured within a specified time period, which are within the buffer distance, is above a predefined threshold and no other mobile object is assigned to the travel route by the one or more processors and a current position of the mobile object is within a buffer of a predefined geographic location of no more than one travel route of the one or more travel routes; and based on the designating, displaying, in real-time, by the one or more processors, on a user interface of the mobile object information relating to the current position of the mobile object, wherein the information comprises the assigned given travel route.

* * * * *

UNITED STATES PATENT AND TRADEMARK OFFICE
CERTIFICATE OF CORRECTION

PATENT NO. : 11,081,010 B2  
APPLICATION NO. : 16/212806  
DATED : August 3, 2021  
INVENTOR(S) : Civitella et al.

Page 1 of 1

It is certified that error appears in the above-identified patent and that said Letters Patent is hereby corrected as shown below:

In the Claims

Column 15, Line 4: Claim 1, Delete "designating, via said by" and insert -- designating, by --

Column 15, Line 48: Claim 9, Delete "of claim wherein" and insert -- of claim 5, wherein --

Column 15, Line 50: Claim 10, Delete "of claim wherein" and insert -- of claim 6, wherein --

Column 15, Line 52: Claim 11, Delete "of claim wherein" and insert -- of claim 6, wherein --

Signed and Sealed this  
Fourteenth Day of September, 2021

Drew Hirshfeld  
*Performing the Functions and Duties of the*  
*Under Secretary of Commerce for Intellectual Property and*  
*Director of the United States Patent and Trademark Office*